Nov. 20, 1934.     P. FRITZSCHE     1,981,412
INTERNAL COMBUSTION ENGINE
Filed Oct. 8, 1931
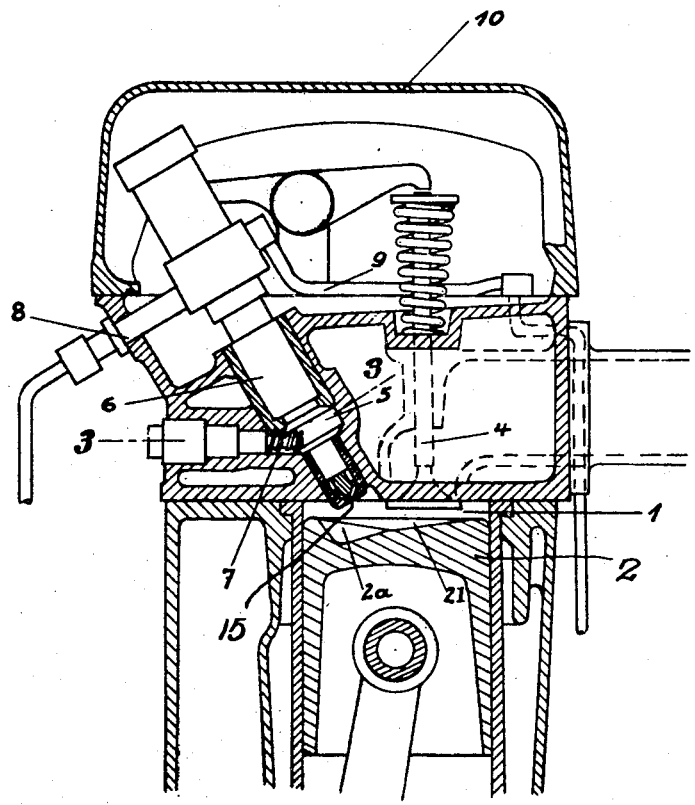
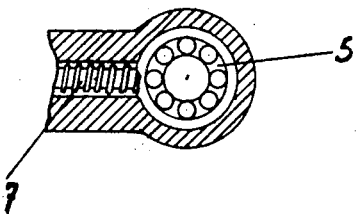
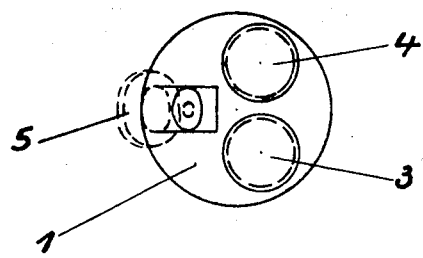
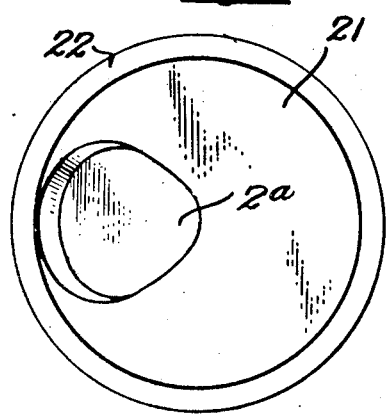
Inventor
Paul Fritzsche.
By: Marks & Clerk Patented Nov. 20, 1934

1,981,412

UNITED STATES PATENT OFFICE

1,981,412

INTERNAL COMBUSTION ENGINE

Paul Fritzsche, Stuttgart-Oberturkheim, Germany, assignor to Daimler-Benz Aktiengesellschaft, Stuttgart-Oberturkheim, Germany, a company of Germany Application October 8, 1931, Serial No. 567,682
In Germany October 9, 1930

3 Claims. (Cl. 123—32)

This invention relates to a Diesel engine having a preliminary combustion chamber, wherein the preliminary combustion chamber in the cylinder head, which receives only a portion of the charge of air, is eccentrically arranged in relation to the axis of the engine cylinder and is also inclined to the said axis.

The object of the invention is to improve such engines by providing in the piston head a recess by which a more advantageous main combustion chamber is formed. By this means a more uniform distribution of the contents of the preliminary combustion chamber is produced in the main combustion chamber, with more advantageous atomization and combustion of the fuel, this result being obtained more particularly by means of a recess in the piston head of such form and position that the centre of gravity of the main combustion chamber lies approximately in alignment with the axis of the preliminary combustion chamber.

A further object of the invention is to construct the recess in the piston head in such a way that in the case of a nozzle-shaped preliminary combustion chamber aperture for example, which produces a flat conical jet of fuel, the distance of the mouth of the preliminary combustion chamber from the piston head is as nearly constant as possible for all jets of fuel.

One example of construction of the invention is illustrated in the accompanying drawing, in which Figure 1 shows a cross section through the cylinder head in the plane of the cylinder axis and of the preliminary combustion chamber axis, and Figure 2 shows diagrammatically the upper wall of the main combustion chamber formed by the cylinder head looking upwards, the preliminary combustion chamber being indicated in part by broken lines.

Figure 3 shows a cross-section on the line 3—3 of Fig. 1 through the preliminary combustion chamber.

Figure 4 shows a top plan view of the piston on an enlarged scale.

In the drawing, 1 is the compression chamber, which is closed on the under side by the piston head 2 which has a shallow conical cavity 21 therein. 3 and 4 are the admission and exhaust valves, which are arranged eccentrically in relation to the axis of the cylinder. On the opposite side of the cylinder axis is eccentrically and obliquely arranged the preliminary combustion chamber 5 having an axial discharge opening 15 and into which an injection nozzle 6 opens coaxially, and into which an ignition device 7 for example also opens. The piston head is provided with a recess 2a extending downwardly from the cavity 21 on the side of the piston head below the precombustion chamber. The cavity 21 which is concentric with the cylinder head and recess 2a, form with the cylinder, in the neighbourhood of the inner dead centre position of the piston, a non-symmetrical main combustion chamber, the centre of volume of which lies approximately on the prolongation of the axis of the preliminary combustion chamber during the travel of the piston in the neighbourhood of the inner dead centre position. The conical cavity 21 does not extend to the periphery of the piston head, being separated therefrom by an annular strip 22, whereby the edge of the cavity is spaced from the cylinder wall. The recess 2a has its maximum depth at the part thereof nearest the side of the piston head (the left-hand side in Figs. 1 and 4) below the preliminary combustion chamber and slopes gradually towards the opposite side, terminating in the neighbourhood of the centre of the piston head.

With the nozzle 6 are connected a fuel pipe 8, coming from a fuel pump, and a leakage oil pipe 9, which collects any oil escaping by leakage at the nozzle needle or needles and conveys it away. A valve cover 10 protects the cylinder head in such a manner that the fuel nozzle is also enclosed by it, and a conveniently rounded exterior is obtained.

By the present invention the further advantage is obtained that notwithstanding the construction of a most advantageous compression space, the walls of the preliminary combustion chamber and of the valve chambers are effectually cooled. The preliminary combustion chamber, in consequence of its oblique position, can be located so far away from the valve chambers that the walls do not touch one another, and an unconstricted cooling water passage can be provided. At the same time the nozzle body may be lodged inside the valve cover.

What I claim is:

1. In an internal combustion engine, the combination of a cylinder and a preliminary combustion chamber arranged laterally of the cylinder with its axis inclined with respect to the axis of the cylinder and having an axial discharge opening arranged to deliver the contents of the preliminary combustion chamber to the cylinder from a point laterally of the cylinder axis in the direction of the axis of the preliminary combustion chamber, with a piston having a head with a shallow concentric cavity therein and a recess extending downwardly from said cavity on the side of the piston head below the preliminary combustion chamber, so as to form with the cylinder head a non-symmetrical main combustion chamber the centre of volume of which lies approximately on the prolongation of the axis of the preliminary combustion chamber during the travel of the piston in the neighbourhood of the inner dead centre position.

2. In an internal combustion engine, the combination of a cylinder and a preliminary combustion chamber arranged laterally of the cylinder with its axis inclined with respect to the axis of the cylinder and having an axial discharge opening arranged to deliver the contents of the preliminary combustion chamber to the cylinder from a point laterally of the cylinder axis in the direction of the axis of the preliminary combustion chamber, with a piston having a head with a shallow conical concentric cavity therein and a recess extending downwardly from said cavity on the side of the piston head below the preliminary combustion chamber, so as to form with the cylinder head a non-symmetrical main combustion chamber the centre of volume of which lies approximately on the prolongation of the axis of the preliminary combustion chamber during the travel of the piston in the neighbourhood of the inner dead centre position.

3. In an internal combustion engine, the combination of a cylinder and a preliminary combustion chamber arranged laterally of the cylinder with its axis inclined with respect to the axis of the cylinder and having an axial discharge opening arranged to deliver the contents of the preliminary combustion chamber to the cylinder from a point laterally of the cylinder axis in the direction of the axis of the preliminary combustion chamber, with a piston having a head with a shallow concentric cavity therein having its edge spaced from the periphery of the piston head and a recess extending downwardly from said cavity on the side of the piston head below the preliminary combustion chamber, so as to form with the cylinder head a non-symmetrical main combustion chamber the centre of volume of which lies approximately on the prolongation of the axis of the preliminary combustion chamber during the travel of the piston in the neighbourhood of the inner dead centre position.

PAUL FRITZSCHE.